(12) United States Patent
Troiani (10) Patent No.: US 10,749,588 B1
(45) Date of Patent: Aug. 18, 2020

(54) SYSTEM AND METHOD FOR REDUCING DISTORTION IN OPTIC LASER OUTPUTS (71) Applicant: Shenzhen Sibroad Microelectronics Co., Ltd, Shenzhen (CN)

(72) Inventor: Matteo Troiani, New York, NY (US)

(73) Assignee: Shenzhen Sibroad Microelectronics Co., Ltd, Shenzhen (CN)

( * ) Notice: Subject to any disclaimer, the term of this patent is extended or adjusted under 35 U.S.C. 154(b) by 0 days.

(21) Appl. No.: 16/679,224

(22) Filed: Nov. 10, 2019

(51) Int. Cl.
H04B 10/58 (2013.01)
H04B 10/50 (2013.01)
H04B 7/06 (2006.01)

(52) U.S. Cl.
CPC ......... H04B 7/0667 (2013.01); H04B 10/504 (2013.01); H04B 10/5057 (2013.01); H04B 10/58 (2013.01)

(58) Field of Classification Search
CPC .................................................. H04B 10/504
See application file for complete search history.

(56) References Cited

U.S. PATENT DOCUMENTS

2005/0041984 A1* 2/2005 Chandler ............. H04B 10/505
398/189
2016/0094295 A1* 3/2016 Doany ............... H04B 10/2507
398/193

* cited by examiner

Primary Examiner — Shi K Li
(74) Attorney, Agent, or Firm — Feng Qian (57) ABSTRACT Various embodiments of signal shaping systems are disclosed. In some embodiments, a signal shaping system comprises an input configured to receive an input signal. The input signal is transmitted as an optic signal. The signal shaping system comprises a first delay module to generate a first delay signal with a first delay compared to the input signal and a second delay module to generate a second delay signal with a second delay compared to the first delay signal. An inverter is configured to invert the first delay signal to generate an inverted first delay signal. A signal addition operation module is configured to add the inverted first delay signal and the second delay signal together and create a first pulse with a duration of the second delay and a second pulse with a duration of the second delay. An amplifier is configured to cut off the first pulse and amplify the second pulse. A bias loop module is configured to keep the amplifier near a cutoff region.

20 Claims, 6 Drawing Sheets

SYSTEM AND METHOD FOR REDUCING DISTORTION IN OPTIC LASER OUTPUTS

TECHNICAL FIELD

The present disclosure generally relates to system and method for reducing distortions in optic laser outputs, and more specifically relates to one or more embodiments of low power signal shaping circuits to reduce distortions in optical laser outputs.

BACKGROUND

Optical communication systems often rely on laser diodes to transmit optical signals into the fibers. Lasers are nonlinear devices and their optical output is often heavily distorted even if they are driven by a fast and smooth electrical waveform. A major challenge for DML (direct modulated laser) drivers is the non-linear behavior of the laser. In response to an input signal, the laser outputs a pulse or a signal rising from a logic level zero to a logic level one or the like. This creates an optical signal with a rising edge and a falling edge. In some embodiments, the optical falling edge of the optical signal is much slower than the rising edge of the optical signal, and moreover the rising edge of the optical signal usually shows ringing behavior due to relaxation oscillation. Such a non-linear behavior degrades eye pattern quality, eye pattern margin and therefore the overall transmission quality. This results in limited data rates or increased bit error rates. It is known that use of signal shaping circuits can help to mitigate those nonlinear effects.

However, signal shaping circuits are usually very power consuming because a differential topology may be implemented and power is needed merely for biasing the structure of the signal shaping circuits. The present disclosure presents a method and a system that solve this technical problem, for example, to implement a low power signal shaping circuit to mitigate nonlinear effects of lasers.

SUMMARY

Described herein are various embodiments of a signal shaping system. The signal shaping system comprises an input, a first delay module, a second delay module, an inverter, a signal addition operation module, an amplifier and a bias loop module.

In one embodiment, the input is configured to receive an input signal which is transmitted as an optic signal.

In one embodiment, the first delay module is configured to generate a first delay signal with a first delay compared to the input signal.

In one embodiment, the second delay module is configured to generate a second delay signal with a second delay compared to the first delay signal.

In one embodiment, the inverter is configured to invert the first delay signal to generate an inverted first delay signal.

In one embodiment, the signal addition operation module is configured to add the inverted first delay signal and the second delay signal together, to create a first pulse with a duration of the second delay and a second pulse with a duration of the second delay.

In one embodiment, the amplifier is configured to cut off the first pulse and amplify the second pulse.

In one embodiment, the bias loop module is configured to keep the amplifier near a cutoff region.

In one embodiment, the first delay module is configured to establish an additional delay which is between a 0-bit and 1-bit period.

In one embodiment, the first delay module is configured to establish a first delay of a half-bit period.

In one embodiment, the amplifier comprises a transistor configured to cut off the first pulse and amplify the second pulse.

In one embodiment, the signal shaping system further comprises a variable gain amplifier which receives the first pulse and the second pulse from the signal addition module and outputs to an input of the amplifier. The variable gain amplifier is configured to regulate the amplitude of the first pulse and the second pulse at the input of the amplifier.

In one embodiment, the amplifier comprises a variable gain amplifier.

In one embodiment, the signal shaping system further comprises a capacitor configured to connect the addition operation module and the amplifier.

In one embodiment, the output of the amplifier connects to an anode or a cathode of a laser connected to the signal shaping system.

A variation of signal shaping system comprises an input, a first inverter, a first delay module, a second delay module, a second inverter, a signal addition operation module, an amplifier and a bias loop module.

In one embodiment, the input is configured to receive an input signal which is transmitted as an optic signal.

In one embodiment, the first inverter is configured to invert the input signal and generate an inverted input signal.

In one embodiment, the first delay module is configured to generate a first delay signal with a first delay compared to the inverted input signal.

In one embodiment, the second delay module is configured to generate a second delay signal with a second delay compared to the first delay signal.

In one embodiment, the second inverter is configured to invert the first delay signal to generate an inverted first delay signal.

In one embodiment, the signal addition operation module is configured to add the inverted first delay signal and the second delay signal together, to create a first pulse with a duration of the second delay and a second pulse with a duration of the second delay.

In one embodiment, the amplifier is configured to amplify the first pulse and cut off the second pulse.

In one embodiment, the bias loop module is configured to keep the amplifier near a cutoff region.

In one embodiment, the first delay module is configured to establish an additional delay which is between a 0-bit and 1-bit period.

In one embodiment, the first delay module is configured to establish a first delay of a half-bit period.

In one embodiment, the amplifier comprises a transistor configured to amplify the first pulse and cut off the second pulse.

In one embodiment, the signal shaping system further comprises a variable gain amplifier which receives the first pulse and the second pulse from the signal addition module and outputs to an input of the amplifier. The variable gain amplifier is configured to regulate the amplitude of the first pulse and the second pulse at the input of the amplifier.

In one embodiment, the amplifier comprises a variable gain amplifier.

In one embodiment, the signal shaping system further comprises a capacitor configured to connect the addition operation module and the amplifier.

In one embodiment, the output of the amplifier connects an anode or a cathode of a laser connected to the signal shaping system.

A method for reducing distortion in optic laser outputs of a laser comprises steps including receiving an input signal, presenting the input signal to a first delay and generating a first delay signal, presenting the first delay signal to a second delay and generating a second delay signal, presenting the first delay signal to an inverter and generating an inverted first delay signal, summing the second delay signal and the inverted first delay signal to create a pulse signal, wherein the pulse signal comprises a first pulse with a duration of the second delay and a second pulse with a duration of the second delay, presenting the pulse signal to an amplifier to generate an amplified pulse signal, wherein the first pulse is cut off and the second pulse is amplified, and injecting the amplified pulse signal to an anode or a cathode of the laser.

In one embodiment, the step of receiving an input signal further comprises receiving a single ended input signal or a differential input signal.

In one embodiment, the step of presenting the input signal to a first delay comprises establishing a first delay of half-bit period.

In one embodiment, the method further comprises a step of biasing the input of the amplifier by a bias loop module.

In one embodiment, the method further comprises a step of keeping the amplifier near a cutoff region.

In one embodiment, the method further comprises a step of inverting of the input signal before the step of presenting the input signal to the first delay.

In one embodiment, the method further comprises a step of regulating the pulse signal before the step of presenting the pulse signal to the amplifier.

In one embodiment, the method further comprises a step of AC coupling before the step of presenting the pulse signal to the amplifier.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

Described herein are various embodiments of a signal shaping system, for example, including one or more low power signal shaping circuits to reduce distortions in optic laser outputs. In some embodiments, an optic laser comprises a differential output, which one side of the differential output may be a cathode output, which is connected to the cathode of the laser diode; and the other side of the differential output may be an anode output, which is connected to the anode of the laser diode. In the present disclosure, one or more current pulses are injected to the cathode output or the anode output, in parallel to the output signal of the optic laser by one or more signal shaping circuits. The one or more signal shaping circuits receive the same input signal from the input signal that inputs to the optic laser.

In some embodiments, the input signal of the one or more signal shaping circuits is delayed and then subtracted from the input signal of the optical laser, resulting in one or more pulsed waveforms where one or more pulses are created at time associated with both rising and falling edges of the input signal waveform. The amount of the delay of the input signal may represent the duration of the pulses. In some embodiments, the amount of the delay is between a half-bit period to one-bit period.

Figure 1:
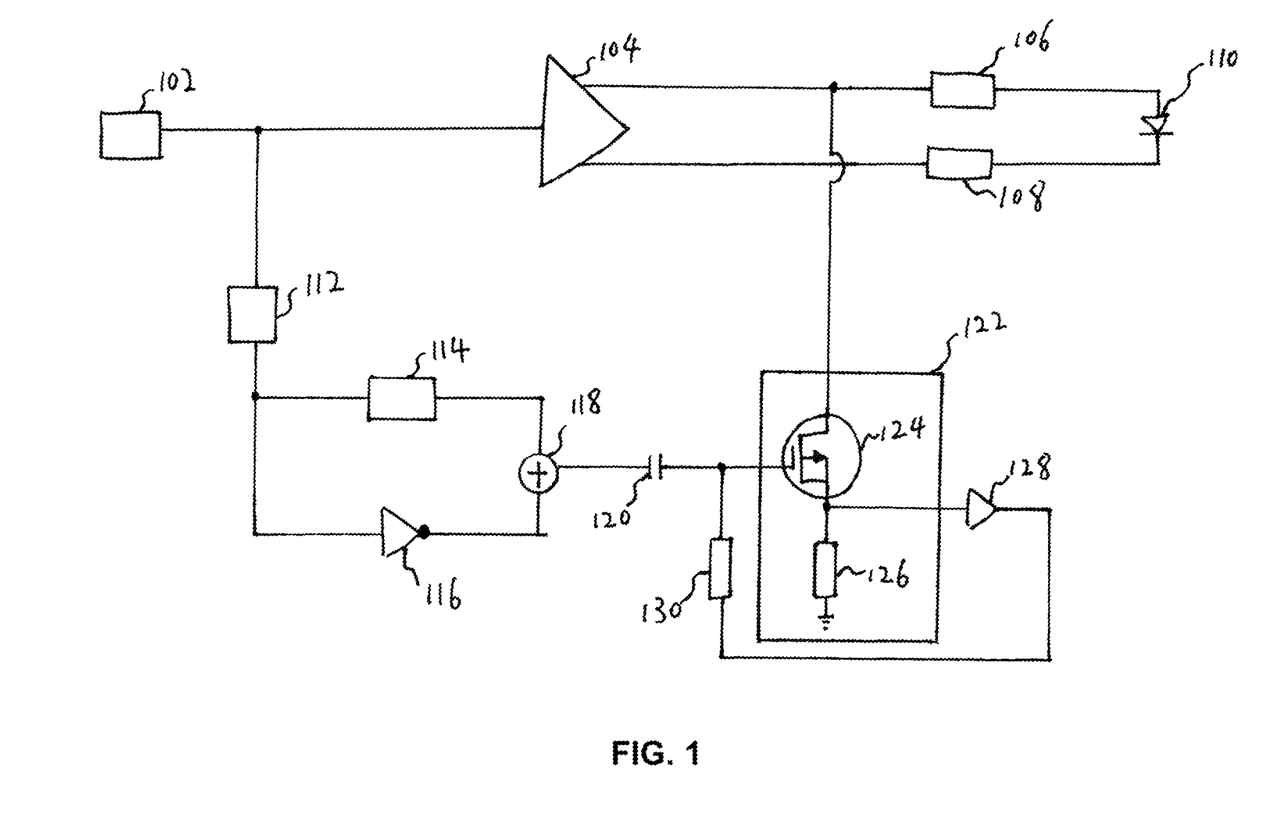
FIG. 1 illustrates an exemplary signal shaping system for reducing distortions in optic laser outputs in accordance with a first embodiment according to the present disclosure.

FIG. 1 illustrates an exemplary signal shaping system for reducing distortions in optic laser outputs in accordance with a first embodiment according to the present disclosure. A signal shaping system 100 illustrated in FIG. 1 is a signal shaping system that shapes an input signal and outputs the shaped signal. For example, the signal shaping system 100 shapes a driving signal to be inputted to a light outputting element such as a laser. The signal to be shaped by the signal shaping system 100, however, is not limited to the driving signal to be inputted to the light outputting element.

As illustrated in FIG. 1, the signal shaping system 100 includes an input 102, an optic laser 104, a first optic laser output 106 and a second optic laser output 108, a laser diode 110, a first delay module 112, a second delay module 114, an inverter 116, a signal addition operation module 118, a capacitor 120, an amplifier 122, a first resistor 126, a bias loop module 128, a second resistor 130. In some embodiments, the input 102 may be configured to receive signals, which may be a differential signal that includes, for example, a normal phase signal and a reverse phase signal. The input 102 connects to the optic laser 104 and the first delay module 112. The optic laser 104 outputs a differential output, including the first optic laser output 106 and the second optic laser output 108, as input to the laser diode 110. In some embodiments, the first optic laser output 106 may connect to the anode of the laser diode 110, and the second optic laser output 108 may connect to the cathode of the laser diode 110. In one embodiment, the current flow of the laser diode 110 is defined as positive from the cathode to the anode. The differential output of the optic laser 104 is a current signal with the rising edge and the falling edge associated to the rising edge and the falling edge of the signal from the input 102, respectively. In some embodiments, the first delay module 112 establishes a first delay from the input 102, and provides a first delayed signal, as an output of the first delay module 112, to the second delay module 114 and the inverter 116. In some embodiments, the first delay may be configured to be, for example, less than 10% of bit period or null. In some embodiments, the first delay module 112 may not be presented. In some embodiments, the second delay module 114 establishes a second delay from the first delay module 112. In this embodiment, the output of the first delay module 112 or the second delay module 114 is the replica of the signal at input 102 delayed by the amount of the first delay or the sum of the first delay and the second delay, respectively. The inverter 116 inverts the first delayed signal from the first delay module 112. The output signal from the second delay module 114 and the output signal from the inverter 116 connect to an input of the signal addition operation module 118. In some embodiments, the signal addition operation module 118 is a module that adds the signals output from the second delay module 114 and the inverter 116 together, and this may result in a pulse signal. In some embodiments, the pulse signal output from the signal addition operation module 118 is inputted to the capacitor 120, which may perform as an AC coupling module. In some embodiments, the amplifier 122 includes a transistor 124 and a first resistor 126. The output signal of the capacitor 120 connects to the input of the amplifier 122, such as the gate of the transistor 124. In some embodiments, the capacitor 120 may not be presented, the pulse signal output from the signal addition operation module 118 may be inputted to the amplifier 122 directly. The amplifier 122, or any other amplifier designed herein, may be any type amplifier configured to adjust (upward or downward) the magnitude, phase, or any other element of a signal. As discussed herein, the amplifiers adjust the magnitude, phase, or both of signals to maintain signal levels when signals are combined (such as through addition or subtraction). The amplifiers described herein may also be configured as buffers. The amplifiers may be single or multiple stage amplifiers and will have associated biasing and optional feedback as needed. The source of the transistor 124 is connected to the resistor 126 which then connects to ground. The signal at the source of the transistor 124 is inputted to a bias loop module 128. The output of the bias loop module 128 is inputted to the resistor 130. The signal output from the resister 130 is inputted back to the input of the amplifier 122, such as the gate of the transistor 124. The transistor 124 is therefore biased close to the turn on threshold or cutoff region. In this way, the pulses on the rising edge of the signal presented to the transistor 124 are amplified, because the transistor is turned on due to the voltage at the gate of the transistor 124 is higher than the threshold voltage of the transistor 124. The pulses on the falling edges of the signal presented to the transistor 124 are cut off, because the voltage at the gate of the transistor 124 is lower than the threshold voltage of the transistor 124, which may push the transistor in cutoff region even further. The transistor 124 is kept near the cutoff region using a feedback loop, for example, the bias loop module 128. This is useful to reduce the power consumption because the bias current is reduced comparing to regular current mode logic (CML) stage. The output of the amplifier 122 can be injected to one of the outputs of the optic laser 104. In this embodiment, the signal from the output of the amplifier 122, such as the drain of the transistor 124, is inputted to the first optic laser output 106, which may connect to the anode of the laser diode. The positive pulse of the signal output from the signal addition operation module 118 may be amplified by the amplifier 122, and the negative pulse of the signal output from the signal addition operation module 118 may be cut off, thus an amplified positive pulse may be injected into the anode of the laser diode 110. The injection may happen right at the rising edge of the output signal of the first optic laser output 106, due to the first delay module 112 may be configured to be very short or null. This may result in a negative pulse in the laser current.

There can be additional delay between the input 102 to the input of the amplifier 122. The additional delay may be used to sync the edges of the signal inputted to input 102 with the edges of the pulse signal from the output of the amplifier 122, compensating for any delay mismatch of the two signal paths. Both the delays and magnitude of the pulse signal can be made independently programmable. The delay control signal presented in the first delay module 112 and the second delay module 114 may be fixed, or vary based on an algorithm or look up table, or set by a user at the time of manufacture or during operation. The magnitude of the pulses can be regulated by changing the amplitude of the pulsed signal at the input of an amplifier using a variable gain amplifier before the amplifier 122 or directly using a variable gain amplifier as the amplifier itself. The magnitude of the pulse amplitude from the output of amplifier 122 may be proportionally related to the signal amplitude inputted to input 102.

Figure 2:
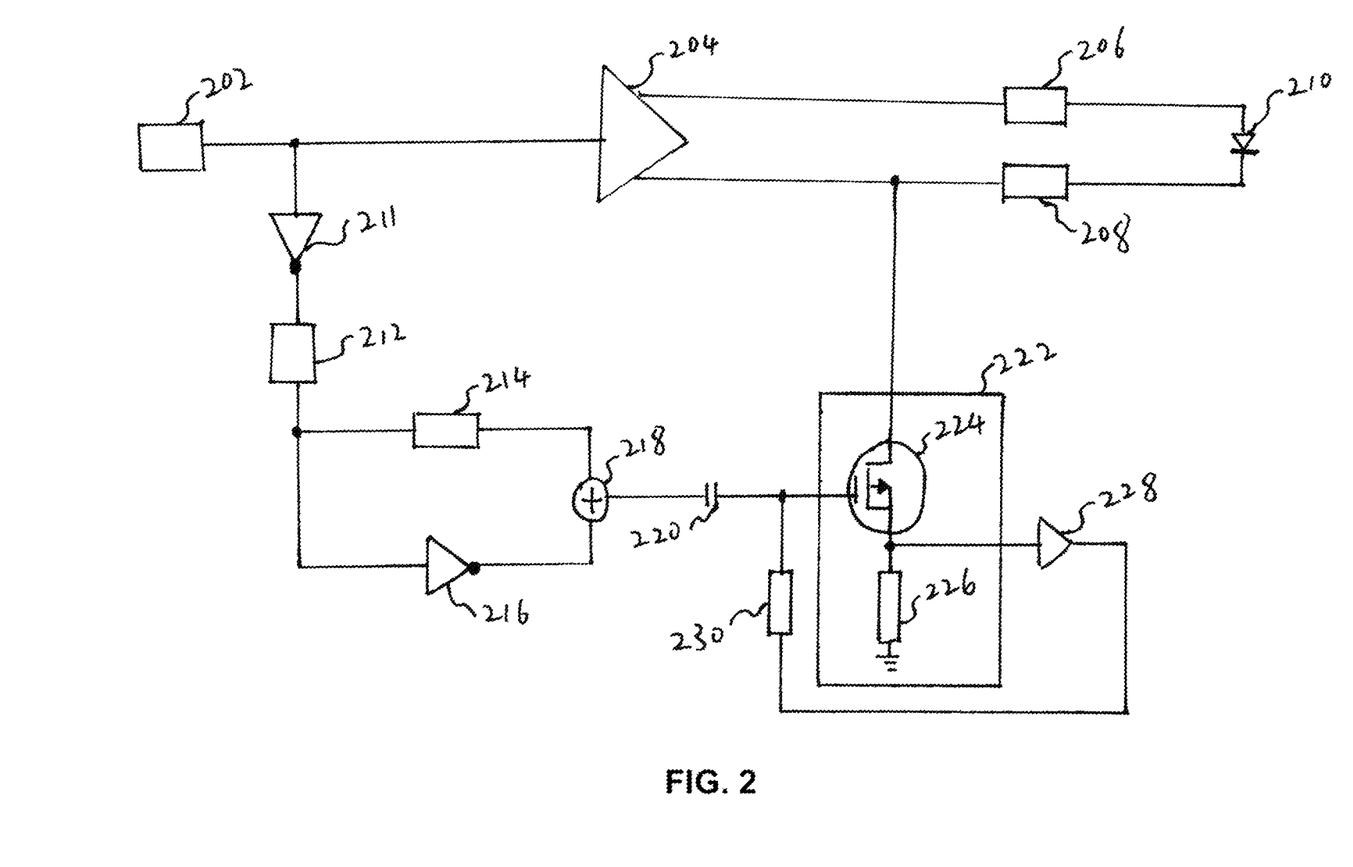
FIG. 2 illustrates an exemplary signal shaping system for reducing distortions in optic laser outputs in accordance with a second embodiment according to the present disclosure.

FIG. 2 illustrates an exemplary signal shaping system for reducing distortions in optic laser outputs in accordance with a second embodiment according to the present disclosure. A signal shaping system 200 illustrated in FIG. 2 is a signal shaping system that shapes an input signal and outputs the shaped signal. For example, the signal shaping system 200 shapes a driving signal to be inputted to a light outputting element such as a laser. The signal to be shaped by the signal shaping system 200, however, is not limited to the driving signal to be inputted to the light outputting element.

As illustrated in FIG. 2, the signal shaping system 200 includes an input 202, an optic laser 204, a first optic laser output 206 and a second optic laser output 208, a laser diode 210, a first inverter 211, a first delay module 212, a second delay module 214, a second inverter 216, a signal addition operation module 218, a capacitor 220, an amplifier 222, a first resistor 226, a bias loop module 228, a second resistor 230. In some embodiments, the input 202 may be configured to receive signals, which may be a differential signal that includes, for example, a normal phase signal and a reverse phase signal. The input 202 connects to the optic laser 204 and the first inverter 211. The optic laser 204 outputs a differential output, including the first optic laser output 206 and the second optic laser output 208, as input to the laser diode 210. In some embodiments, the first optic laser output 206 may connect to the anode of the laser diode 210, and the second optic laser output 208 may connect to the cathode of the laser diode 210. In one embodiment, the current flow of the laser diode 210 is defined as positive from the cathode to the anode. The differential output of the optic laser 204 is a current signal with the rising edge and the falling edge associated to the rising edge and the falling edge of the signal from the input 202, respectively. In some embodiments, the first inverter 211 inverts the signal from the input 202, and outputs the inverted signal to the input of the first delay module 212. In some embodiments, the first delay module 212 establishes a first delay from the inverter 211, and provides a first delayed signal, as an output of the first delay module 212, to the second delay module 214 and the second inverter 216. In some embodiments, the first delay may be configured to be half-bit period or any value such that the pulse can be injected in the middle of a laser output cycle, such as an eye diagram. In some embodiments, the second delay module 214 establishes a second delay from the first delay module 212. In this embodiment, the output of the first delay module 212 or the second delay module 214 is the inverted replica of the signal at input 202 delayed by the amount of the first delay or the sum of the first delay and the second delay, respectively. The second inverter 216 inverts the first delayed signal from the first delay module 212. The output signal from the second delay module 214 and the output signal from the second inverter 216 connect to an input of the signal addition operation module 218. In some embodiments, the signal addition operation module 218 is a module that adds the signals output from the second delay module 214 and the second inverter 216 together, and this may result in a pulse signal. In some embodiments, the pulse signal output from the signal addition operation module 218 is inputted to the capacitor 220, which may perform as an AC coupling module. In some embodiments, the amplifier 222 includes a transistor 224 and a first resistor 226. The output signal of the capacitor 220 connects to the input of the amplifier 222, such as the gate of the transistor 224. In some embodiments, the capacitor 220 may not be presented, the pulse signal output from the signal addition operation module 218 may be inputted to the amplifier 222 directly. The amplifier 222, or any other amplifier designed herein, may be any type amplifier configured to adjust (upward or downward) the magnitude, phase, or any other element of a signal. As discussed herein, the amplifiers adjust the magnitude, phase, or both of signals to maintain signal levels when signals are combined (such as through addition or subtraction). The amplifiers described herein may also be configured as buffers. The amplifiers may be single or multiple stage amplifiers and will have associated biasing and optional feedback as needed. The source of the transistor 224 is connected to the resistor 226 which then connects to ground. The signal at the source of the transistor 224 is inputted to a bias loop module 228. The output of the bias loop module 228 is inputted to the resistor 230. The signal output from the resister 230 is inputted back to the input of the amplifier 222, such as the gate of the transistor 224. The transistor 224 is therefore biased close to the turn on threshold or cutoff region. In this way, the pulses on the rising edge of the signal presented to the transistor 224 are amplified, because the transistor is turned on due to the voltage at the gate of the transistor 224 is higher than the threshold voltage of the transistor 224. The pulses on the falling edges of the signal presented to the transistor 224 are cut off, because the voltage at the gate of the transistor 224 is lower than the threshold voltage of the transistor 224, which may push the transistor in cutoff region even further. The transistor 224 is kept near the cutoff region using a feedback loop, for example, the bias loop module 228. This is useful to reduce the power consumption because the bias current is reduced comparing to regular current mode logic (CIVIL) stage. The output of the amplifier 222 can be injected to one of the outputs of the optic laser 204. In this embodiment, the signal from the output of the amplifier 222, such as the drain of the transistor 224, is inputted to the second optic laser output 208, which may connect to the cathode of the laser diode. The positive pulse of the signal output from the signal addition operation module 218 may be amplified by the amplifier 222, and the negative pulse of the signal output from the signal addition operation module 218 may be cut off, thus an amplified positive pulse may be injected into the cathode of the laser diode 210. This may result in a positive pulse in the laser current in the laser diode 210.

If a signal shaping circuit gets the input with the same polarity as the input signal of an optic laser, the pulses generated by the signal shaping circuit may apply to the rising edge of the output of the optic laser only. If an input signal is inverted before arriving at a signal shaping circuit, the pulses generated by the signal shaping circuit may apply to the falling edge of the output of optic laser only.

Figure 3:
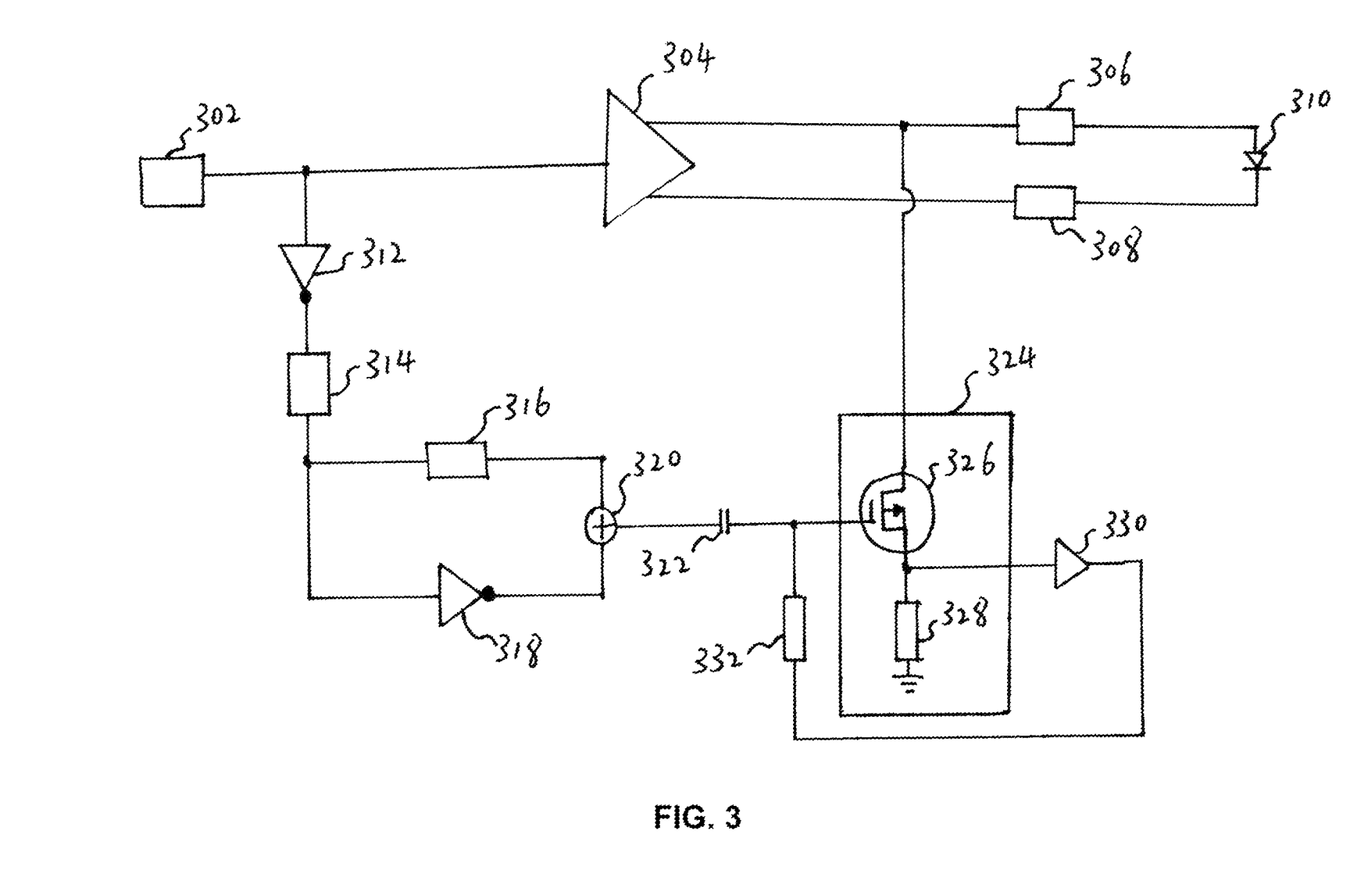
FIG. 3 illustrates an exemplary signal shaping system for reducing distortions in optic laser outputs in accordance with a third embodiment according to the present disclosure.

FIG. 3 illustrates an exemplary signal shaping system for reducing distortions in optic laser outputs in accordance with a third embodiment according to the present disclosure. A signal shaping system 300 illustrated in FIG. 3 is a signal shaping system that shapes an input signal and outputs the shaped signal. For example, the signal shaping system 300 shapes a driving signal to be inputted to a light outputting element such as a laser. The signal to be shaped by the signal shaping system 300, however, is not limited to the driving signal to be inputted to the light outputting element.

As illustrated in FIG. 3, the signal shaping system 300 includes an input 302, an optic laser 304, a first optic laser output 306 and a second optic laser output 308, a laser diode 310, a first inverter 312, a first delay module 314, a second delay module 316, a second inverter 318, a signal addition operation module 320, a capacitor 322, an amplifier 324, a first resistor 328, a bias loop module 330, a second resistor 332. In some embodiments, the input 302 may be configured to receive signals, which may be differential signal that includes, for example, a normal phase signal and a reverse phase signal. The input 302 connects to the optic laser 304 and the first inverter 312. The optic laser 304 outputs a differential output, including the first optic laser output 306 and the second optic laser output 308, as input to the laser diode 310. In some embodiments, the first optic laser output 306 may connect to the anode of the laser diode 310, and the second optic laser output 308 may connect to the cathode of the laser diode 310. In one embodiment, the current flow of the laser diode 310 is defined as positive from the cathode to the anode. The differential output of the optic laser 304 is a current signal with the rising edge and the falling edge associated to the rising edge and the falling edge of the signal from the input 302, respectively. In some embodiments, the first inverter 312 inverts the signal from the input 302, and outputs the inverted signal to the input of the first delay module 314. In some embodiments, the first delay module 314 establishes a first delay from the inverter 312, and provides a first delayed signal, as an output of the first delay module 314, to the second delay module 316 and the second inverter 318. In some embodiments, the first delay may be configured to be, for example, less than 10% of bit period or null. In some embodiments, the first delay module 314 may not be presented. In some embodiments, the second delay module 316 establishes a second delay from the first delay module 314. In this embodiment, the output of the first delay module 314 or the second delay module 316 is the inverted replica of the signal at input 302 delayed by the amount of the first delay or the sum of the first delay and the second delay, respectively. The second inverter 318 inverts the first delayed signal from the first delay module 314. The output signal from the second delay module 316 and the output signal from the second inverter 318 connect to an input of the signal addition operation module 320. In some embodiments, the signal addition operation module 320 is a module that adds the signals output from the second delay module 316 and the second inverter 318 together, and this may result in a pulse signal. In some embodiments, the pulse signal output from the signal addition operation module 320 is inputted to the capacitor 322, which may perform as an AC coupling module. In some embodiments, the amplifier 324 includes a transistor 326 and a first resistor 328. The output signal of the capacitor 322 connects to the input of the amplifier 324, such as the gate of the transistor 326. In some embodiments, the capacitor 322 may not be presented, the pulse signal output from the signal addition operation module 320 may be inputted to the amplifier 324 directly. The amplifier 324, or any other amplifier designed herein, may be any type amplifier configured to adjust (upward or downward) the magnitude, phase, or any other element of a signal. As discussed herein, the amplifiers adjust the magnitude, phase, or both of signals to maintain signal levels when signals are combined (such as through addition or subtraction). The amplifiers described herein may also be configured as buffers. The amplifiers may be single or multiple stage amplifiers and will have associated biasing and optional feedback as needed. The source of the transistor 326 is connected to the resistor 328 which then connects to ground. The signal at the source of the transistor 326 is inputted to a bias loop module 330. The output of the bias loop module 330 is inputted to the resistor 332. The signal output from the resister 332 is inputted back to the input of the amplifier 324, such as the gate of the transistor 326. The transistor 326 is therefore biased close to the turn on threshold or cutoff region. In this way, the pulses on the rising edge of the signal presented to the transistor 326 are amplified, because the transistor is turned on due to the voltage at the gate of the transistor 326 is higher than the threshold voltage of the transistor 326. The pulses on the falling edges of the signal presented to the transistor 326 are cut off, because the voltage at the gate of the transistor 326 is lower than the threshold voltage of the transistor 326, which may push the transistor in cutoff region even further. The transistor 326 is kept near the cutoff region using a feedback loop, for example, the bias loop module 330. This is useful to reduce the power consumption because the bias current is reduced comparing to regular current mode logic (CIVIL) stage. The output of the amplifier 324 can be injected to one of the outputs of the optic laser 304. In this embodiment, the signal from the output of the amplifier 324, such as the drain of the transistor 326, is inputted to the first optic laser output 306, which may connect to the anode of the laser diode. The positive pulse of the signal output from the signal addition operation module 320 may be amplified by the amplifier 324, and the negative pulse of the signal output from the signal addition operation module 320 may be cut off, thus an amplified positive pulse may be injected into the anode of the laser diode 310. The injection may happen right at the falling edge of the output signal of the first optic laser output 306, due to the first delay module 314 may be configured to be very short or null. This may result in a negative pulse in the laser current as the output of the amplifier 324 may be connected to the anode of the laser diode 310.

Figure 4:
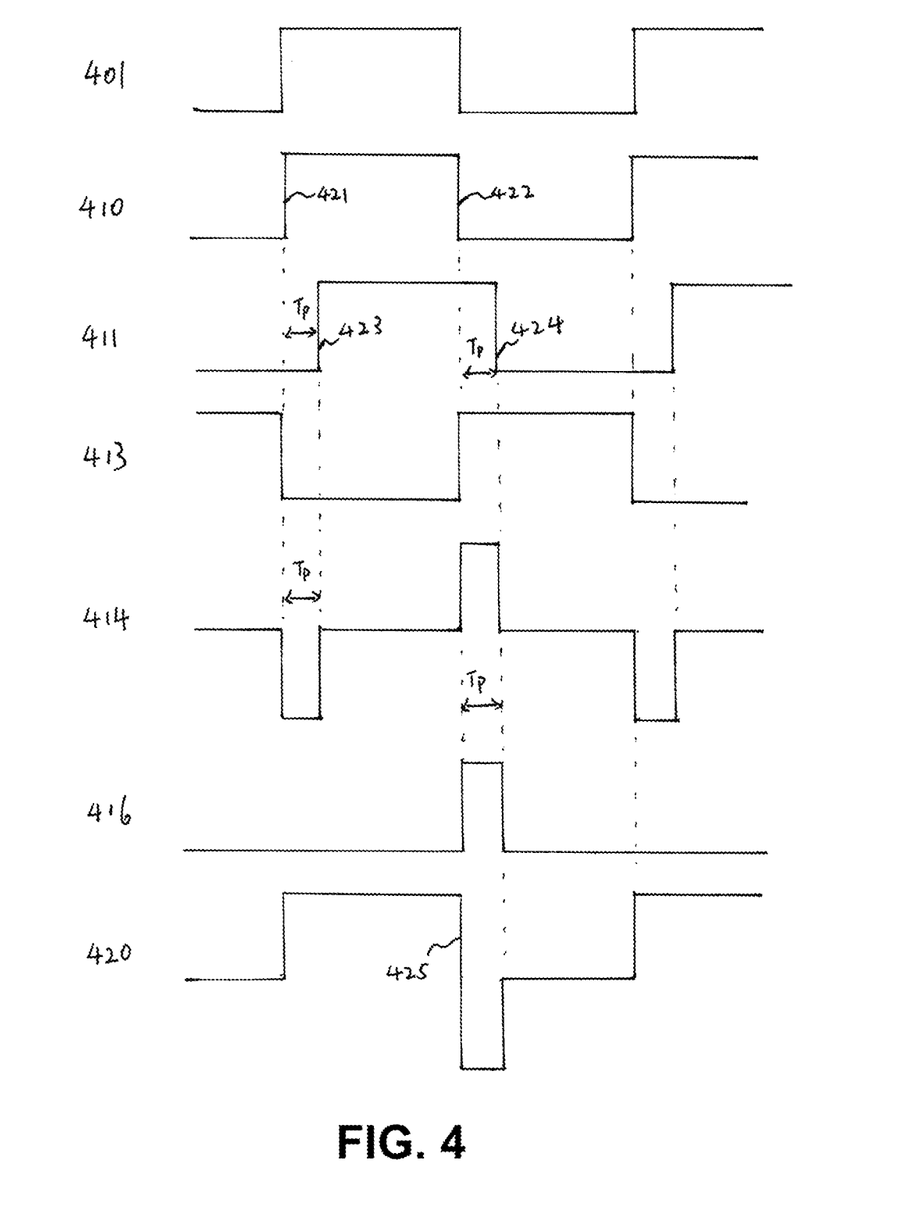
FIG. 4 illustrates an exemplary set of signal waveforms associated with the signal shaping system as shown in FIG. 1.

FIG. 4 illustrates an exemplary set of signal waveforms associated with the signal shaping system as shown in FIG. 1.

Time is shown on the horizontal axis 430 while signal amplitude is shown on the vertical axis 440. Signal waveform 401 is an exemplary input signal of the input 102, which is also presented as input signal to the optic laser 104 and the first delay module 112. Signal waveform 410 is the output signal of the first delay module 112 as shown in FIG. 1. As can be seen, it is time varying and includes a rising edge 421 and a falling edge 422. As illustrated in FIG. 4, the rising edge 421 of the signal waveform 410 and the falling edge 422 of the signal waveform 410 are delayed by an amount of Tb. As shown in FIG. 4, Tb is null. In some embodiments, Tb may be very short. Signal waveform 410 is provided as an input signal to the second delay module 114 and the inverter 116. Signal waveform 411 is the output of the second delay module 114. As illustrated in FIG. 4, the rising edge 423 and the falling edge 424 of the signal waveform 411 is delayed with an amount of Tp as compared to the signal waveform 410. Signal waveform 413 is the output of the inverter 116, as illustrated, and the signal waveform 413 is the inversion of the signal waveform 410. The signal waveform 411 and the signal waveform 413 are provided as input signals to the signal addition operation module 118. Signal waveform 414 is the output of the signal addition operation module 118. As illustrated in FIG. 4, signal waveform 411 and signal waveform 413 are added together and the resulting signals are positive and negative pulses with the duration associated with the amount of Tp. The signal waveform 414 may be inputted to the amplifier 122 with or without the capacitor 120, which can perform as an AC coupling module. The signal waveform 419 is the output signal of the amplifier 122, as illustrated, with the negative pulse is cut off, and only the positive pulse is presented. The signal waveform 419 may be injected into the first optic laser output 106 as illustrated in FIG. 1. Signal waveform 420 is the current signal observed in the laser diode 110 with the signal waveform 419 injected. Since the current signal output from the optic laser 104 associated with the rising edge and the falling edge of the input 102, thus when there is a rising edge presented in the input 102, there will be a positive current at the laser diode 110. The current direction of the laser diode 110 is from the cathode to the anode. The first optic laser output 106 connects to the anode of the laser diode. Thus, the current level observed at the first optic laser output 106 may be negative when there is a positive current flow in the laser diode 110. Therefore, when there is a rising edge at the signal waveform 401, the value of signal waveform 420 becomes positive. When a positive pulse is injected into the first optic laser output 106, this may reduce the current from the cathode to the anode of the laser diode 110. Thus, a positive pulse in the signal waveform 419 may result a negative pulse in the signal waveform 420. As illustrated in FIG. 4, a negative pulse is established at the falling edge 425 of the signal waveform 420, associated with the positive pulse in the signal waveform 419.

Figure 5:
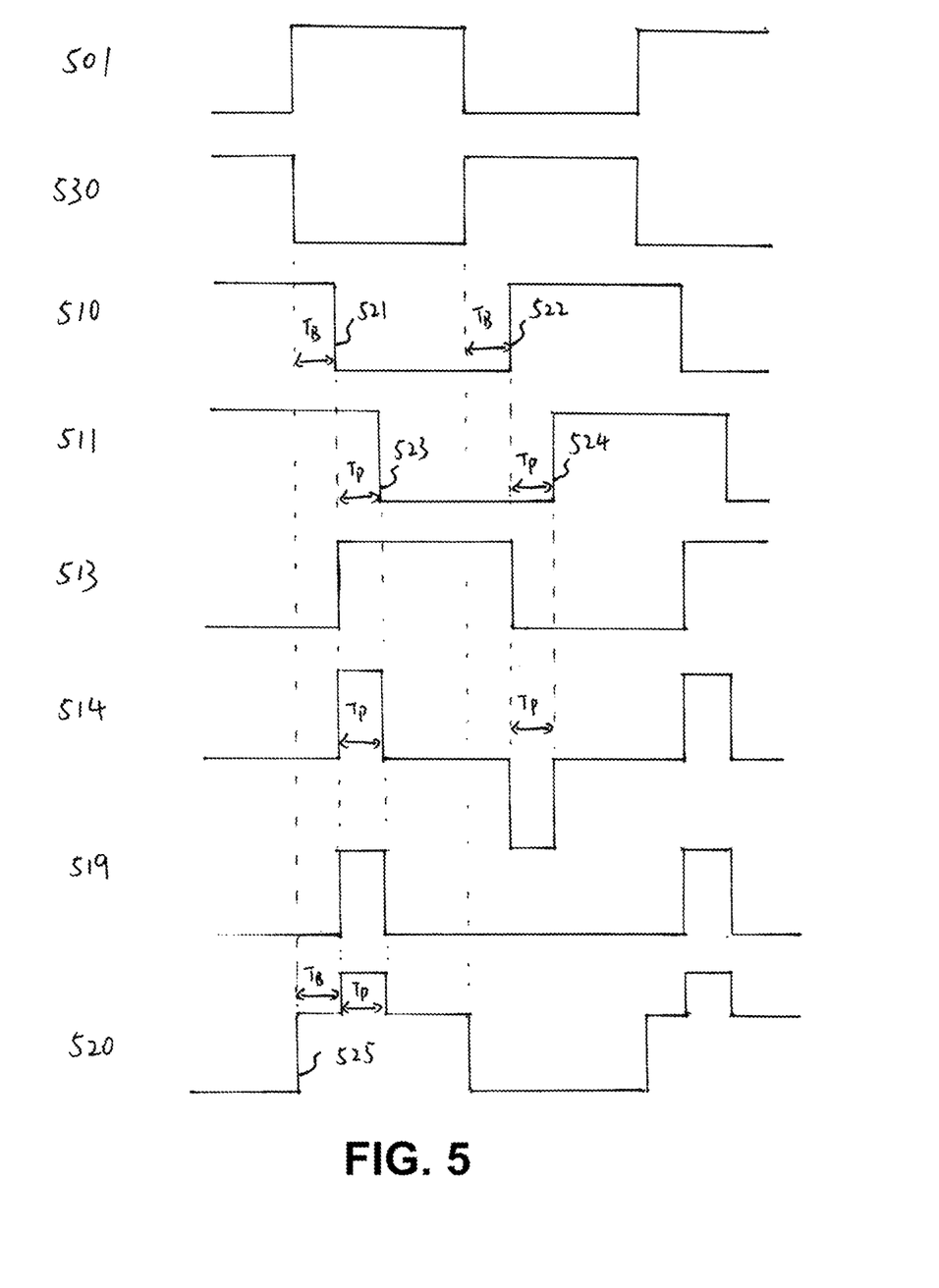
FIG. 5 illustrates an exemplary set of signal waveforms associated with the signal shaping system as shown in FIG. 2.

FIG. 5 illustrates an exemplary set of signal waveforms associated with the signal shaping system as shown in FIG. 2.

Time is shown on the horizontal axis 540 while signal amplitude is shown on the vertical axis 550. Signal waveform 501 is an exemplary input signal of the input 202, which is also presented as input signal to the optic laser 204 and the first delay module 212. Signal waveform 530 is the output of the first inverter 211, as illustrated, the signal waveform 530 is the inversion of the signal waveform 501. Signal waveform 510 is the output signal of the first delay module 212 as shown in FIG. 2. As can be seen, it is time varying and includes a falling edge 521 and a rising edge 522. As illustrated in FIG. 5, the falling edge 521 and the rising edge 522 of the signal waveform 510 are delayed by an amount of Tb. Tb may equal to half-bit period. Signal waveform 510 is provided as an input signal to the second delay module 214 and the second inverter 216. Signal waveform 511 is the output of the second delay module 214. As illustrated in FIG. 5, the falling edge 523 and the rising edge 524 of the signal waveform 511 is delayed with an amount of Tp as compared to the signal waveform 510. Signal waveform 513 is the output of the second inverter 216, as illustrated, and the signal waveform 513 is the inversion of the signal waveform 510. The signal waveform 511 and the signal waveform 513 are provided as input signals to the signal addition operation module 218. Signal waveform 514 is the output of the signal addition operation module 218. As illustrated in FIG. 5, signal waveform 511 and signal waveform 513 are added together and the resulting signals are positive and negative pulses with the duration associated with the amount of Tp. The signal waveform 514 may be inputted to the amplifier 222 with or without the capacitor 220, which can perform as an AC coupling module. The signal waveform 519 is the output signal of the amplifier 222, as illustrated, with the negative pulse is cut off, and only the positive pulse is presented. The signal waveform 519 may be injected into the second optic laser output 208 as illustrated in FIG. 2. Signal waveform 520 is the current signal observed at the laser diode 210 when the signal waveform 519 is injected into the second optic laser output 208. Since the current signal output from the optic laser 204 associated with the rising edge and the falling edge of the input 202, thus when there is a rising edge presented in the input 202, there will be a positive current at the laser diode 210. The current direction of the laser diode 210 is from the cathode to the anode. The second optic laser output 208 connects to the anode of the laser diode. Therefore, when there is a rising edge at the signal waveform 501, the value of signal waveform 520 becomes positive. When a positive pulse is injected into the second optic laser output 208, this may increase the current from the cathode to the anode of the laser diode 210, as the second optic laser output 208 may connect to the cathode of the laser diode 210. Thus, a positive pulse in the signal waveform 519 may result a positive pulse in the signal waveform 520. As illustrated in FIG. 5, a positive pulse is established with a delay of the amount of Tb from the rising edge 525 of the signal waveform 520, associated with the positive pulse in the signal waveform 519.

Figure 6:
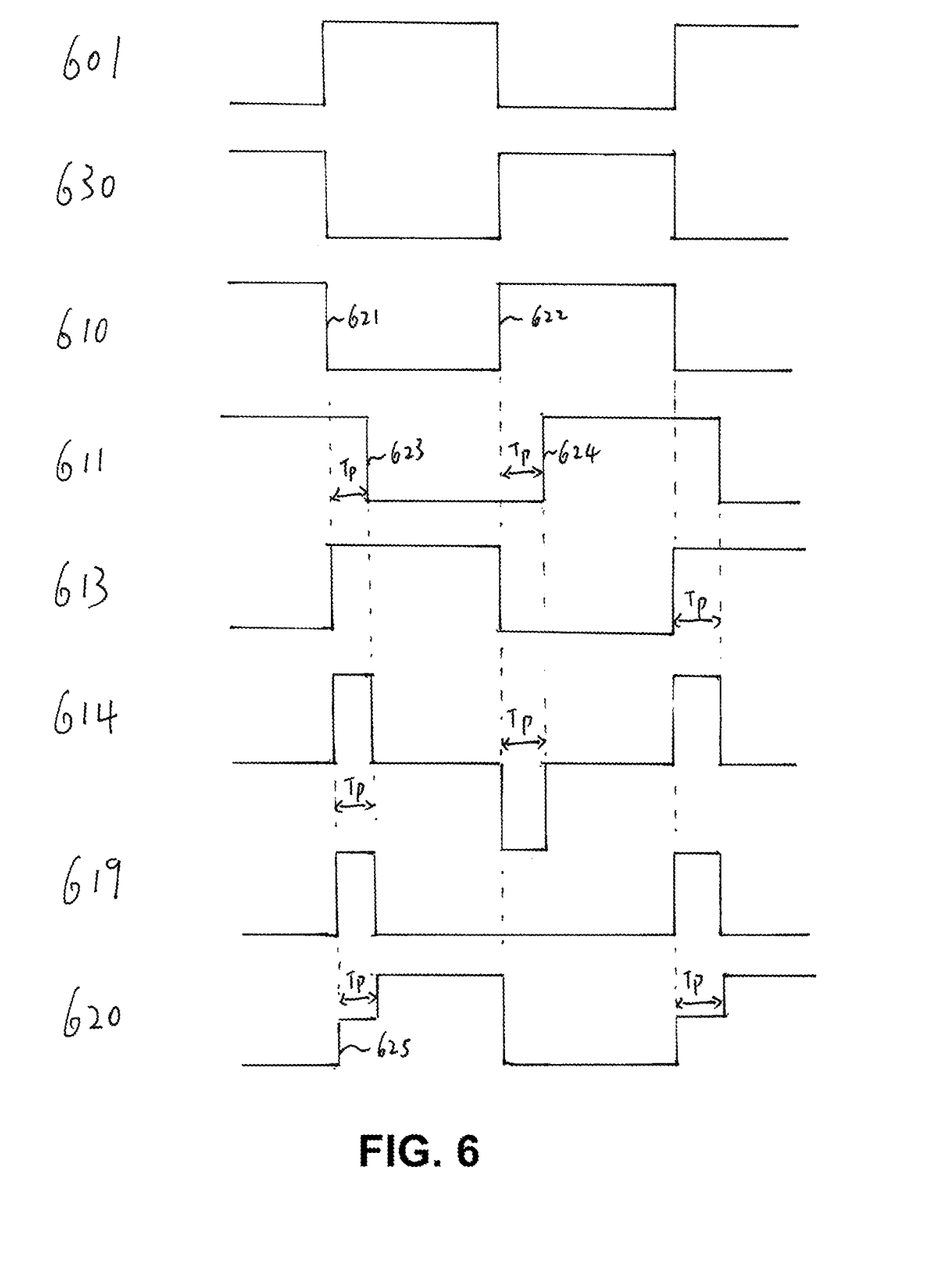
FIG. 6 illustrates an exemplary set of signal waveforms associated with the signal shaping system as shown in FIG. 3.

FIG. 6 illustrates an exemplary set of signal waveforms associated with the signal shaping system as shown in FIG. 3.

Time is shown on the horizontal axis 640 while signal amplitude is shown on the vertical axis 650. Signal waveform 601 is an exemplary input signal of the input 302, which is also presented as input signal to the optic laser 304 and the first inverter 312. Signal waveform 630 is the output of the first inverter 312, as illustrated, the signal waveform 630 is the inversion of the signal waveform 601. Signal waveform 610 is the output signal of the first delay module 314 as shown in FIG. 3. As can be seen, it is time varying and includes a falling edge 621 and a rising edge 622. As illustrated in FIG. 6, the falling edge 621 and the rising edge 622 of the signal waveform 610 are delayed by an amount of Tb as compared to the signal waveform 630. As shown in FIG. 6, Tb is null. In some embodiments, Tb can be very short. The signal waveform 610 is provided as an input signal to the second delay module 316 and the second inverter 318. Signal waveform 611 is the output of the second delay module 316. As illustrated in FIG. 6, the falling edge 623 and the rising edge 624 of the signal waveform 611 is delayed with an amount of Tp as compared to the signal waveform 610. Signal waveform 613 is the output of the second inverter 318, as illustrated, and the signal waveform 613 is the inversion of the signal waveform 610. The signal waveform 611 and the signal waveform 613 are provided as input signals to the signal addition operation module 320. The signal waveform 614 is the output of the signal addition operation module 320. As illustrated in FIG. 6, the signal waveform 611 and the signal waveform 613 are added together and the resulting signals are positive and negative pulses with the duration associated with the amount of Tp. The signal waveform 614 may be inputted to the amplifier 324 with or without the capacitor 322, which can perform as an AC coupling module. The signal waveform 619 is the output signal of the amplifier 324, as illustrated, with the negative pulse is cut off, and only the positive pulse is presented. The signal waveform 619 may be injected into the first optic laser output 306 as illustrated in FIG. 3. Signal waveform 620 is the current signal observed at the laser diode 310 with the signal waveform 619 injected. Since the current signal output from the optic laser 304 associated with the rising edge and the falling edge of the input 302, thus when there is a rising edge presented in the input 302, there will be a positive current at the laser diode 310. The current direction of the laser diode 310 is from the cathode to the anode. The first optic laser output 306 connects to the anode of the laser diode. Thus, the current level observed at the first optic laser output 306 may be negative when there is a positive current flow in the laser diode 310. Therefore, when there is a rising edge at the signal waveform 601, the value of signal waveform 620 becomes positive. When a positive pulse injected at the first optic laser output 306, this may reduce the current from the cathode to the anode of the laser diode 310. Thus, a positive pulse in the signal waveform 619 may result a negative pulse in the signal waveform 620. As illustrated in FIG. 6, a negative pulse is established at the rising edge 625 of the signal waveform 620, associated with the positive pulse in the signal waveform 619.

The optical output of the laser usually shows a ringing rising edge with an initial overshoot happening right in the rising edge of the output signal of an optic laser and a undershoot right after that, while the falling edge of the output of the optic laser is very slow. This is the result of the distortion mentioned before. As the waveform figures (FIG. 4, FIG. 5, FIG. 6) illustrate, the present disclosure can help reduce all these distortions by establishing positive or negative pulse at desired position of the output signal of an optic laser. All these three embodiments can be applied in parallel and controlled independently, and the configuration of the signal shaping system in present disclosure is not limited to these three embodiments.

From the main input to the input of the transistor, the system is linear, as it is well known, the order of the blocks in a linear system can be rearranged and the resulting output may be the same. As a consequence, the order of those blocks as described before is just one of the possible embodiments and should not be considered as a limitation of the present disclosure.

What is claimed is:

1. A signal shaping system, comprising:
   an input configured to receive an input signal, wherein the input signal is transmitted as an optic signal;
   a first delay module configured to generate a first delay signal with a first delay compared to the input signal;
   a second delay module configured to generate a second delay signal with a second delay compared to the first delay signal;
   an inverter configured to invert the first delay signal to generate an inverted first delay signal;
   a signal addition operation module configured to add the inverted first delay signal and the second delay signal together, to create a first pulse with a duration of the second delay and a second pulse with a duration of the second delay;
   an amplifier configured to cut off the first pulse and amplify the second pulse; and
   a bias loop module configured to keep the amplifier near a cutoff region.

2. The system of claim 1, wherein the first delay module is configured to establish an additional delay which is between a 0-bit and 1-bit period.

3. The system of claim 1, wherein the first delay module is configured to establish a first delay of a half-bit period.

4. The system of claim 1, wherein the amplifier comprises a transistor configured to cut off the first pulse and amplify the second pulse.

5. The system of claim 1, further comprising a variable gain amplifier which is configured to receive the first pulse and the second pulse from the signal addition module and output to an input of the amplifier, wherein the variable gain amplifier is configured to regulate the amplitude of the first pulse and the second pulse at the input of the amplifier.

6. The system of claim 1, wherein the amplifier comprises a variable gain amplifier.

7. The system of claim 1, further comprising a capacitor configured to connect the addition operation module and the amplifier.

8. The system of claim 1, wherein the output of the amplifier connects to an anode or a cathode of a laser connected to the signal shaping system.

9. A signal shaping system, comprising:
   an input configured to receive an input signal, wherein the input signal is transmitted as an optic signal;
   a first inverter configured to invert the input signal and generate an inverted input signal;
   a first delay module configured to generate a first delay signal with a first delay compared to the inverted input signal;
   a second delay module configured to generate a second delay signal with a second delay compared to the first delay signal;
   a second inverter configured to invert the first delay signal to generate an inverted first delay signal;
   a signal addition operation module configured to add the inverted first delay signal and the second delay signal together, to create a first pulse with a duration of the second delay and a second pulse with a duration of the second delay;
   an amplifier configured to amplify the first pulse and cut off the second pulse; and
   a bias loop module configured to keep the amplifier near a cutoff region.

10. The system of claim 9, wherein the first delay module is configured to establish an additional delay which is between a 0-bit and 1-bit period.

11. The system of claim 9, wherein the first delay module is configured to establish a first delay of a half-bit period.

12. The system of claim 9, wherein the amplifier comprises a transistor configured to amplify the first pulse and cut off the second pulse.

13. The system of claim 9, further comprising a variable gain amplifier which is configured to receive the first pulse and the second pulse from the signal addition module and outputs to an input of the amplifier, wherein the variable gain amplifier is configured to regulate the amplitude of the first pulse and the second pulse at the input of the amplifier.

14. The system of claim 9, wherein the amplifier comprises a variable gain amplifier.

15. The system of claim 9, further comprising a capacitor configured to connect the addition operation module and the amplifier.

16. The system of claim 9, the output of the amplifier connects to an anode or a cathode of a laser connected to the signal shaping system.

17. A method for reducing distortion in optic laser outputs of a laser comprising:
   receiving an input signal;
   presenting the input signal to a first delay and generating a first delay signal;
   presenting the first delay signal to a second delay and generating a second delay signal;
   presenting the first delay signal to an inverter and generating an inverted first delay signal;
   summing the second delay signal and the inverted first delay signal to create a pulse signal, wherein the pulse signal comprises a first pulse with a duration of the second delay and a second pulse with a duration of the second delay;
   presenting the pulse signal to an amplifier to generate an amplified pulse signal, wherein the first pulse is cut off and the second pulse is amplified; and
   injecting the amplified pulse signal to an anode or a cathode of the laser.

18. The method of claim 17, the step of receiving an input signal further comprises receiving a single ended input signal or a differential input signal.

19. The method of claim 17, the step of presenting the input signal to a first delay comprises establishing a first delay of a half-bit period.

20. The method of claim 17, further comprising a step of biasing the input of the amplifier by a bias loop module.

* * * * *